Nov. 5, 1968   R. GOTTSCHALD   3,409,318
ANGLE JOINT, ESPECIALLY FOR THE LINKAGE OF VEHICLES
Filed May 25, 1966

3,409,318
ANGLE JOINT, ESPECIALLY FOR THE LINKAGE OF VEHICLES
Rudolf Gottschald, Osterath, Germany, assignor to A. Ehrenreich & Cie, Dusseldorf-Oberkassel, Germany
Filed May 25, 1966, Ser. No. 552,949
Claims priority, application Germany, May 26, 1965, E 21,708
2 Claims. (Cl. 287—90)

ABSTRACT OF THE DISCLOSURE

An angle joint, especially for use in connection with vehicles, in which a housing member has a tubular shank and a head forming a socket with a spherical inner surface slidably and directly engaging the ball head of the ball stud forming a part of the angle joint, said spherical inner surface terminating at a plane extending through said ball head at least approximately transverse to the longitudinal axis of said ball stud while being spaced from the neck end of said ball head, the wall of said housing member head which defines said spherical inner surface of said socket continuing in a direction away from the spherical inner surface in spaced relationship to said neck portion and terminating in a thin annular sealing bellows extending inwardly toward and finally engaging said neck portion so as to provide a lubricant chamber having its outer wall partly formed by the wall of said housing member head and partly formed by said bellows.

---

The present invention relates to an angle joint, especially for the linkage of vehicles, which is provided with a housing head for receiving the ball head of a ball stud. Joints of this type are employed for instance in connection with windshield wipers and also with the linkage pertaining to the carburetor or the like, for instance with motor vehicles. Heretofore, housings of steel have been employed in which ball cups of synthetic material are inserted. Joints of this type have a relatively great number of parts and, therefore, are expensive in construction and manufacture.

It is, therefore, an object of the present invention to provide an angle joint of the above mentioned general type, which will be greatly simplified in construction and thereby reduced in cost.

It is another object of this invention to provide an angle joint as set forth in the preceding paragraph, which while being simple in design will be reliable in operation.

These and other objects and advantages of the invention will appear more clearly from the following specification in connection with the accompanying drawing, in which.

Figure 1:
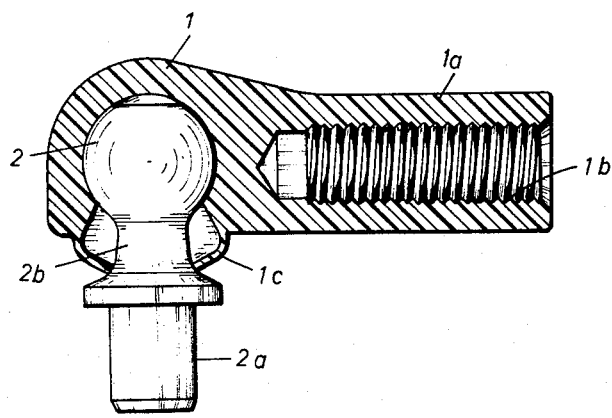
FIG. 1 illustrates an angle joint according to the present invention, partially in longitudinal section and partially in view.
Figure 2:
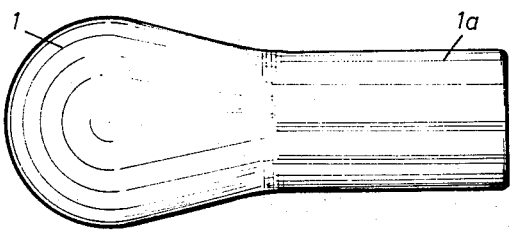
FIG. 2 is a top view of FIG. 1.

The angle joint according to the present invention is characterized primarily in that the housing head, the tubular shank, and the sealing bellows of the joint form a single integral one piece member of synthetic material. As synthetic material in this connection there may be used polyurethane.

More specifically, referring to the drawing, the angle joint comprises a housing head 1 and a housing shank 1a which is formed as a single integral piece. The housing shank 1a is in a manner known per se provided with a threaded inner bore 1b. The housing head 1 has mounted therein a ball head 2 which in its turn forms a single piece with a ball stud 2a having a neck 2b. Housing head 1 has formed thereon and integral therewith a sealing bellows 1c which surrounds neck 2b and may form a chamber for receiving and storing a lubricant. The said sealing bellows 1c simultaneously protects the joint against soiling.

As will be evident from the above, the angle joint according to the present invention is of particularly simple construction and requires a minimum of parts. Inasmuch as only minor angle movements occur in such angle joint, a lubrication of such joints is generally not required, particularly if a lubricant is enclosed in the bellows 1c during the assembly of the joint.

It is, of course, to be understood that the present invention is, by no means, limited to the particular construction shown in the drawing but also comprises any modifications within the scope of the appended claims.

What I claim is:
1. An angle joint, especially for use in connection with vehicles, which includes: a ball stud having a ball head and a stud section and a neck portion interconnecting said ball head and said stud section, and a housing member made of plastic material and having a tubular shank and a socket member forming a single one-piece entirety with said tubular shank and defining a spherical inner surface slidably and directly engaging said ball head, said spherical inner surface terminating at a plane extending through said ball head at least approximately transverse to the longitudinal axis of said ball stud while being spaced from the neck end of said ball head, said socket member also comprising a wall portion extending from said plane in the direction toward said stud section and having an inner wall surface that flares from said plane in the direction away from said ball head, said wall portion beyond said flaring inner wall surface terminating in an integral thin annular sealing bellows extending from the widest portion of said flaring inner wall surface radially inwardly toward and finally engaging said neck portion so as to provide a lubricant chamber having its inner wall surface partly formed by the said flaring wall surface and partly formed by said bellows.

2. An angle joint according to claim 1, in which said tubular shank and said socket member and said bellows together form a single integral and unitary member of polyurethane.

References Cited

UNITED STATES PATENTS

| | | | |
|---|---|---|---|
| 1,923,601 | 8/1933 | Weaver | 287—90 |
| 2,791,454 | 5/1957 | Saives | 287—85 |
| 2,876,029 | 3/1959 | Latzen | 287—90 |
| 3,224,801 | 12/1965 | Price-Stephens et al. | 287—90 |

FOREIGN PATENTS

| | | |
|---|---|---|
| 198,143 | 6/1958 | Austria. |
| 591,374 | 4/1959 | Italy. |
| 1,090,114 | 9/1960 | Germany. |
| 997,836 | 7/1965 | Great Britain. |

CARL W. TOMLIN, *Primary Examiner.*

A. KUNDRAT, *Assistant Examiner.*